United States Patent [19]

Leuschner

[11] Patent Number: 4,498,424

[45] Date of Patent: Feb. 12, 1985

[54] ANIMAL FEEDING METHOD AND APPARATUS

[75] Inventor: Peter Leuschner, Emsbüren, Fed. Rep. of Germany

[73] Assignee: Hölscher & Leuschner GmbH & Co., Emsbüren, Fed. Rep. of Germany

[21] Appl. No.: 492,082

[22] Filed: May 6, 1983

[30] Foreign Application Priority Data

May 15, 1982 [DE] Fed. Rep. of Germany ....... 3218438

[51] Int. Cl.³ .............................................. A01K 5/02
[52] U.S. Cl. ............................ 119/51 R; 119/52 AF
[58] Field of Search ............. 119/51 R, 51.11, 52 AF

[56] References Cited

U.S. PATENT DOCUMENTS

| 2,929,356 | 3/1960 | Bacigalupo | 119/51 R |
| 3,553,441 | 1/1971 | Launder | 119/51 R X |
| 4,049,950 | 9/1977 | Byrne et al. | 119/51 R X |
| 4,433,577 | 2/1984 | Khurgin et al. | 119/14.17 |

Primary Examiner—Hugh R. Chamblee
Attorney, Agent, or Firm—Jordan and Hamburg

[57] ABSTRACT

A method and apparatus for feeding animals such as hogs includes measuring behavior values of the animals, and controlling the feeding of the animals based on such measured behavior values. The amount of feed is thereby controlled to the animal's needs to provide optimal feed utilization. The behavior value measured includes the eating behavior and eating speed of the animals.

16 Claims, 2 Drawing Figures

ANIMAL FEEDING METHOD AND APPARATUS

BACKGROUND OF THE INVENTION

The invention relates to a method and apparatus for feeding animals.

Efforts to achieve scientific and technical work methods, which correspond to industrial standards, have recently led to an advanced progress in animal farming. Efforts to largely control the strong irregularities, weather influences and disturbances, traditionally plaguing animal farming have been especially successful. Scientific research has resulted in reference values which are continuously supplemented and corrected. However, such values represent but rough clues for successful animal farming.

Furthermore, considerations have been made especially as regards the data processing and memory capacity of computers for the continuous registration of measured values, especially as regards feed utilization and based on this, the regulation of the amount of feed, the feed composition and other conditions related to animal farming, in particular climatic conditions, in order to achieve efficient feed utilization. However, it has been proven difficult to arrive at a reliable basis for optimization based on, for example, the weight increase of an animal, the milk or egg production of individual animals or animal groups with extremely small changes in the results.

Accordingly, it is the object of the present invention to develop a method and arrangement allowing the optimization of the feeding of animals, especially hogs, in a more reliable and metrologically less complicated way.

According to the invention, this object is accomplished with a feeding method utilizing the behavior characteristics of the animals. The advantage of applicant's invention becomes clear when considering that the behavior of the animals delivers a much faster and more distinct treatment result, that is a feeding result, which provides feeding optimization in a reliable and faster manner.

Various types of behavior characteristics can be used individually or in combination with one another to evaluate the behavior. Thus, basically, the movement behavior, the breathing behavior, the release of sounds, etc. can be brought into play. The eating behavior of the animal is, however, of prime interest as regards the feeding and furthermore, easy to determine because of its localization to the feeding place.

It has proven to be particularly effective to consider the time an animal or an animal group needs to consume a predetermined amount of feed as a criterion for the eating behavior and to relate an optimization of the feed amount and/or feed composition to a set reference time, i.e., when the feed is consumed faster the amount of feed is increased and vice versa.

Other features which are considered characteristic of the invention are set forth in the appended claims.

Although the invention is illustrated and described in relationship to specific embodiments it is nevertheless not intended to be limited to the details shown, since various modifications and structural changes may be made therein without departing from the spirit of the invention and within the scope and range of equivalents of the claims.

The construction and operation o the invention, however, together with additional objects and advantages thereof will be best understood from the following description of specific embodiments when read in connection with the accompanying drawings.

DESCRIPTION OF THE PREFERRED EMBODIMENTS

Figure 1:
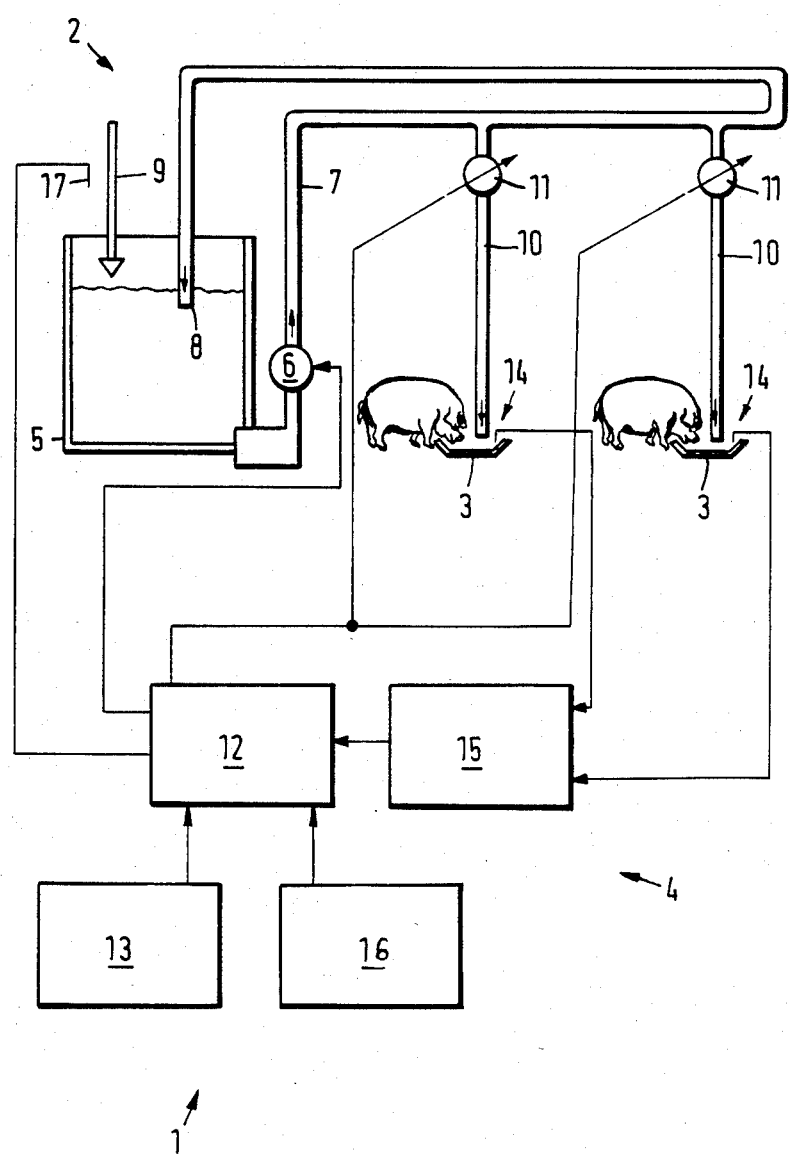
FIG. 1 is a schematic view of a feeding arrangement according to one embodiment of the invention.

The feeding arrangement indicated in its entirety by the numeral 1 in FIG. 1 comprises a feed allocator 2, two troughs 3 and an electronic control 4.

The feed allocator 2 comprises a feed mixing container 5, a feed line 7 extending from the container 5, a pump 6 and a return line with an end 8. The feed line 7 and return line form a loop. Furthermore, at least one supply line 9 for feed components empties into the feed mixing container 5.

The feed line 7 has branch lines 10 leading to the troughs 3. Each feed line 7 has a feed or dosage valve 11. The feed route originates in the components, which have been supplied to and mixed in the feed mixing container 5, continues to line 7, is dosaged by feed valve 11 into the trough 3, where it is to be consumed by the animals. The example in the drawings shows only one hog per trough, but, in principal, the above applies to other animals and to a group of animals as well.

The allocated amounts are traditionally predetermined and monitored by a control device 12 which comprises an input part 13, which can put the important data into the control device. However, this method only allows set amounts of feed, which can be changed only manually, when the animals for instance grow, pass through particular phases in life, or as a consequence of changed climatic values develop more or less appetites.

In order to accomplish a fast and satisfactory adjustment to the needs of the animals and thus attain generally superior feed utilization, the animal behavior is monitored and evaluated and the feed need adjusted accordingly. It is understood that the animal behavior cannot be registered in all its details, but that the object is to arrive at possibly representative and easily attainable values.

In principal, the movement behavior, the breathing behavior, and much more could be measured and stored in the form of data. It is of particular interest in the present case to monitor the eating behavior of the animal in order to optimize the feed allocation. Monitoring of the filling level of the trough is thus provided by means of a filling level device or indicator 14 which represents a reliable measure of the feed present in the trough 3, especially in the case of the common liquid feed.

In order to monitor the eating behavior it is, for example, assumed that the animal (or a group of animals in a common stall) are to consume 90% of the content in a trough within 10 minutes. If this amount is not consumed within 10 minutes, this is shown by the filling level indicator via a measuring converter or transformer 15 and registered by the control device 12 which ascertains that the next feed allocation is reduced by a preset percentage value. Thus, the feed allocation follows the feed requirements indicated by the animal's eating behavior.

In order to simplify the design of the filling level indicator 14 as much as possible, this could be given the task to monitor only one filling level. Adjusted or set to a residue filling level, it could show 90% emptying of the trough, with the time up to this emptying being the measure for the eating behavior.

In comparison, the described embodiment provides for the filling level indicator comprising a measuring area extending above the filling level of the trough. In this way, monitoring takes place when the trough is being filled as well, determining the filling level reached, and thus the amount of feed to be put in. When reaching the amount determined by the preset dosage, the corresponding feed valve 11 is closed. Thus, not only the eating speed but also the dosage can be controlled by means of the filling level indicator 14.

The filling level indicator 14 is, in this example, an ultrasound device or converter, arranged above the trough, directed to the liquid level in the trough, and monitoring the feed level in the trough. Of course, a number of known path or depth measuring methods can be used instead of an ultrasound time measuring device like, for example, a capacitor measurement device between two electrodes. As another example, a pressure gauge may be disposed in the trough, especially in an indentation in the trough. The pressure gauge can monitor the liquid pressure depending on the filling level.

The amount of feed in the trough can, or course, also be determined by weighing, although the animal touching the trough might lead to errors.

The control device 12 is further connected to a measuring device 16 for environmental data, so that particular climatic data and other influences during the feed dosage can be taken into consideration.

The previously described principle of feed allocation can also be used when adding the components into the feed mixing container 5. An additional filling level indicator 17 is directed to the feed level in the feed mixing container 5. When adding the feed components, the change in the filling level is checked and thereafter the amount added monitored centrally over the monitoring device, being technically simple and appropriate for the total control.

Figure 2:
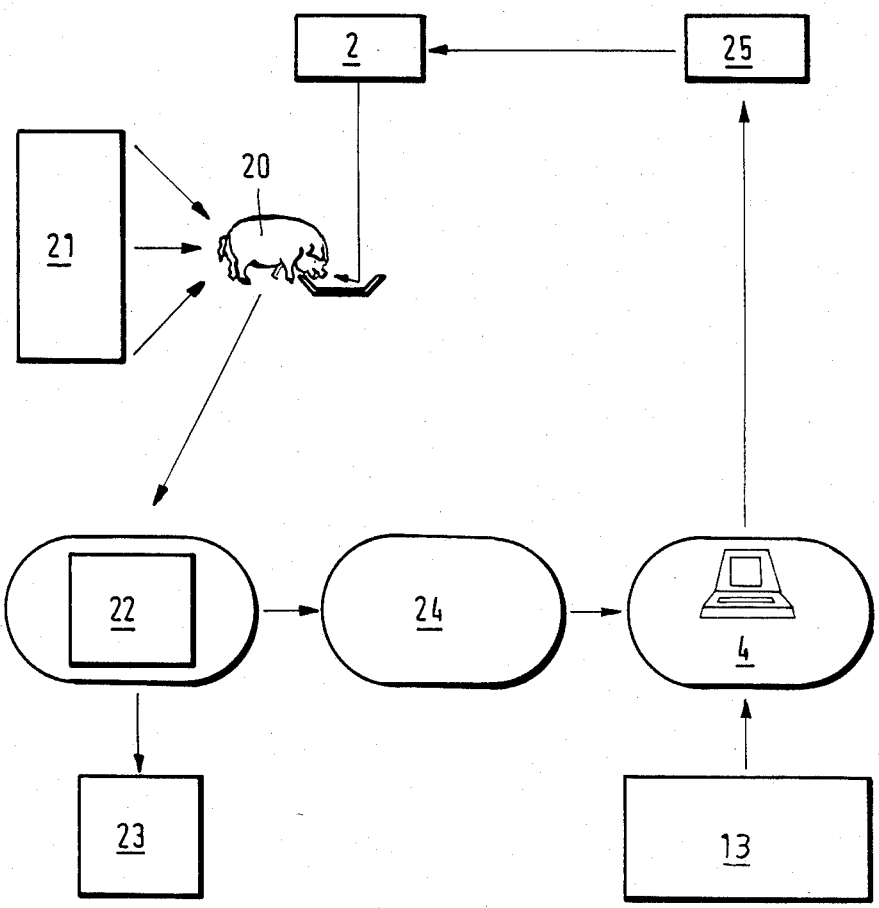
FIG. 2 is a block diagram of the feeding arrangement according to FIG. 1.

The general principle of the method is again described in FIG. 2. The animal designated as 20 is on the one hand "exposed" to being fed by a feed allocator 2, and, on the other hand, exposed to various environmental influences which can be sensed and input to an input device indicated schematically at 21. The animal processes these input values primarily to an animal-like behavior 22 and secondarily to an animal-like performance 23. Since the animal-like performance is generally only subject to minimal, difficult to measure, and delayed changes, a metrological acquisition 24 is released from the animal-like behavior resulting in metrological values in a control device 4. A reference value comparison 25 thereafter effectuates a preset change in the feed allocation in feed allocator 2. Initial values and reference values for the sensitivity to change are put into this control system via input device 13.

The storage of data and the processing of stored as well as of measured data makes the use of digital electronics, especially process computers, microprocessors or the like, appropriate from a cost as well as application view point, because of their versatility facilitating changes and supplements to the total system.

The feeding can be varied by monitoring the total amount of feed but also by varying its components, and finally, the feeding times and the feeding frequency can be varied as well.

Typically, the control is substantially represented by a computer. The control device 12 in FIG. 2 is formed by a typical central unit with data processing and data storage, and the input device 13 is a manual keyboard for manual entry normally connected to a central unit. The measuring transformer 15 is a suitable interface unit of a usual type for multiplexing and pulse forming. The measuring device 16 for environmental data can be a usual electronic measuring apparatus for temperature and humidity.

What I claim is:

1. Animal feeding apparatus comprising a feeding trough from which animals eat, supply means for supplying animal feed to said trough, measuring means on said trough for measuring the rate at which the animals eat the animal feed from said trough such that said measured eating rate is indicative of the behavior value of the animals, and control means operable in response to said measured rate to control the amount of feed subsequently supplied to said trough based on said prior measured rate such that the animal's own behavior thereby determines the amount of feed supplied to said trough.

2. Animal feeding apparatus according to claim 1 wherein said measuring means measures the amount of animal feed in said trough and the amount of time taken by said animals to eat said measured amount of animal feed.

3. Animal feeding apparatus according to claim 1 wherein said measuring means comprises a pressure sensitive device for measuring the amount of animal feed in said trough.

4. Animal feeding apparatus according to claim 1 wherein said measuring means comprises a metrological device.

5. Animal feeding apparatus according to claim 1, wherein said measuring means is constructed and arranged to measure the amount of time the animals take in eating a known quantity of animal feed.

6. Animal feeding apparatus according to claim 1, wherein said animal feed is in liquid form.

7. Animal feeding apparatus according to claim 1 wherein said measuring means comprises a level device for measuring the level of animal feed in said trough.

8. Animal feeding apparatus according to claim 7 wherein said measuring means comprises a capacitor device arranged in said trough.

9. Animal feeding apparatus according to claim 8 wherein said animal feed is in liquid form and said capacitor device responds to the liquid level in said trough.

10. Animal feeding apparatus according to claim 1 wherein said supply means comprises a supply container for said animal feed, a main feed line for supplying animal feed to a plurality of troughs, a plurality of branch lines with one branch line being provided between each trough and said main feed line, a dosage device disposed in each one of said branch lines for controlling the dosage of animal feed supplied to said trough, a pump in said main line for supplying animal feed to said main line, and a return line forming a continuation of said main line and returning animal feed back to said supply container.

11. Animal feeding apparatus according to claim 10 further comprising a filling level indicator for said supply container, said filling level indicator being connected to said control means, whereby said control means controls the mixing of the animal feed.

12. A method of feeding animals comprising supplying animal feed from a source of supply to a feeder, measuring the rate at which the animals eat said animal feed from said feeder such that the measured rate is indicative of the behavior value of the animals, utilizing said measured rate as a control value input, and controlling the amount of animal feed supplied to said feeder in response to said control value input such that the animal's own behavior thereby determines the amount of feed supplied to said feeder.

13. A method according to claim 12, wherein the step of measuring the rate at which the animals eat said animal feed comprises measuring the amount of time the animals take in eating a known quanity of animal feed.

14. A method according to claim 12, wherein said animal feed is in a form which is pumped through a conduit to said feeder.

15. A method according to claim 12, wherein said animal feed is in liquid form.

16. A method of automatically feeding animals with fluid-like animal feed comprising supplying a portion of animal feed from a source of supply of said fluid-like animal feed through a conduit to a trough, measuring the rate at which the animals eat said portion from the trough such that said measured rate is indicative of the behavior value of the animal, supplying said trough with another portion of said animal feed from said source of supply through said conduit, automatically controlling the amount of said other portion based on said measured rate such that the animal's own behavior thereby determines the amount of feed supplied to said trough, and subsequently automatically repeating said controlling step such that the amount of animal feed supplied to said trough is determined by the rate at which the animals eat the prior portion.

* * * * *